United States Patent
Shabdanov et al.

(10) Patent No.: US 12,507,082 B2
(45) Date of Patent: Dec. 23, 2025

(54) METHOD AND APPARATUS OF HANDLING COORDINATED ASSOCIATION IN A WIRELESS NETWORK WITH MULTIPLE ACCESS POINTS

(71) Applicant: MediaTek Singapore Pte. Ltd., Singapore (SG)

(72) Inventors: Samat Shabdanov, San Jose, CA (US); Chien-Fang Hsu, Hsinchu (TW); Po-Yuen Cheng, Hsinchu (TW); Weisung Tsao, San Jose, CA (US); Chung-Ta Ku, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 332 days.

(21) Appl. No.: 17/879,745

(22) Filed: Aug. 2, 2022

(65) Prior Publication Data
US 2023/0050633 A1 Feb. 16, 2023

Related U.S. Application Data

(60) Provisional application No. 63/231,289, filed on Aug. 10, 2021.

(51) Int. Cl.
*H04W 24/02* (2009.01)
*H04W 24/10* (2009.01)

(52) U.S. Cl.
CPC ........... *H04W 24/02* (2013.01); *H04W 24/10* (2013.01)

(58) Field of Classification Search
CPC ............................. H04W 24/02; H04W 24/10
See application file for complete search history.

(56) References Cited

U.S. PATENT DOCUMENTS

| | | | |
|---|---|---|---|
| 11,019,515 B1 | 5/2021 | Sun | |
| 2011/0149766 A1* | 6/2011 | Choi | H04L 43/0817 370/252 |
| 2015/0289201 A1 | 10/2015 | Stupar | |
| 2015/0334598 A1 | 11/2015 | Duo | |
| 2017/0013513 A1* | 1/2017 | Agarwal | H04W 36/22 |
| 2017/0280337 A1 | 9/2017 | Bahr | |
| 2018/0115941 A1* | 4/2018 | Wang | H04W 48/14 |
| 2018/0279192 A1* | 9/2018 | Raissinia | H04W 36/38 |
| 2019/0075469 A1* | 3/2019 | Mahoney | H04B 17/318 |
| 2019/0132762 A1 | 5/2019 | Zhu | |
| 2020/0112871 A1 | 4/2020 | Merlin | |
| 2020/0120544 A1* | 4/2020 | Liu | H04W 28/26 |
| 2021/0084493 A1* | 3/2021 | Naribole | H04W 12/041 |

(Continued)

FOREIGN PATENT DOCUMENTS

| | | | |
|---|---|---|---|
| WO | 2017/098441 A1 | 6/2017 | |
| WO | 2019/005027 | 1/2019 | |

(Continued)

*Primary Examiner* — Sujoy K Kundu
*Assistant Examiner* — Weibin Huang
(74) *Attorney, Agent, or Firm* — Winston Hsu

(57) ABSTRACT

A method and an apparatus for handling coordinated association in a wireless network with multiple access points are described. A method comprises receiving network parameters, determining a plurality of AP-STA associations, and sending the plurality of associations to the STAs. An apparatus includes controlling, managing, and optimization modules implementing the method of handling coordinated association in a wireless network.

16 Claims, 6 Drawing Sheets

(56) References Cited

U.S. PATENT DOCUMENTS

2021/0194659 A1    6/2021  Sevin
2022/0159759 A1*   5/2022  Sugaya ................. H04L 5/0044

FOREIGN PATENT DOCUMENTS

WO    WO-2019066867 A1 *  4/2019  ............ H04W 24/08
WO       2020/076203 A1    4/2020
WO       2020/080850 A1    4/2020

* cited by examiner

METHOD AND APPARATUS OF HANDLING COORDINATED ASSOCIATION IN A WIRELESS NETWORK WITH MULTIPLE ACCESS POINTS

CROSS REFERENCE TO RELATED APPLICATIONS

This application claims the benefit of U.S. Provisional Application No. 63/231,289, filed on Aug. 10, 2021. The content of the application is incorporated herein by reference.

BACKGROUND

The present invention generally relates to the field of wireless communications. More specifically, the embodiments of the present invention relate to a method and an apparatus of handling coordinated association in a wireless network with multiple access points (APs).

In an 802.11 network, a station (STA) first needs to discover a list of available APs and then the STA needs to decide which an AP to choose for association. At present, the 802.11 standard does not regulate how STAs choose an AP for association nor specify to APs any mechanisms and protocols how to manage it for the STAs. In essence, the 802.11 standard offloads association decisions solely on the STAs. These decisions are governed by an association method employed at the STAs. There exist many STA-controlled association methods that rely on various decision metrics. However, currently only methods adopting the Received Signal Strength Indicator (RSSI) metric are widely employed in practice.

Since its introduction, all the 802.11-based systems suffer from multi-rate throughput degradation, low latency, and network load imbalance. Remarkably, that in fact, these problems stem from using the existing association methods. The principal reason behind this is that the STA-controlled methods aim to maximize only its own STA performance while, as a result, degrading network-wise performance. Therefore, it is practically impossible to solve above problems in conventional 802.11 systems without considering alternative association approaches.

SUMMARY

The embodiments of the present invention therefore disclose a method and an apparatus of handling coordinated association in a wireless network with multiple access points.

According to one embodiment, a method of handling coordinated association (CA) in a wireless network with a plurality of access points (APs) for an apparatus is disclosed. The method includes receiving a plurality of network parameters; determining a plurality of associations between a plurality of stations (STAs) and the plurality of APs according to the plurality of network parameters; and sending the plurality of associations to the plurality of STAs.

According to another embodiment of the invention, an apparatus for handling coordinated association in a wireless network with a plurality of access points is disclosed. The apparatus includes a controlling module, for receiving a plurality of network parameters and for sending a plurality of associations to a plurality of stations (STAs); and an optimizing module, coupled to the controlling module, for determining the plurality of associations between the plurality of STAs and the plurality of APs according to the plurality of network parameters.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

The Multiple Access Point (MAP) system is being considered by the 802.11 standard to be a next generation Wireless Local Area Network (WLAN). In such a MAP WLAN, when the association request with APs is coordinated and managed centrally, it is possible to achieve higher throughput, to improve latency, and to balance network traffic load. This notion of centralized coordination of AP-STA association requests serves as a niche concept for the disclosed in the invention method and apparatus.

The disclosed invention herein provides a method and an apparatus for performing associations between STAs and APs in a wireless network with MAP, wherein the association requests are coordinated and centrally managed in accordance with functionalities implemented within a CA controller. The APs in the MAP communicate with the CA controller in accordance with a predefined backhaul protocol for receiving and sending data and control information. A STA can only communicate with the corresponding AP associated with the STA and in accordance with the 802.11 standard.

Figure 1:
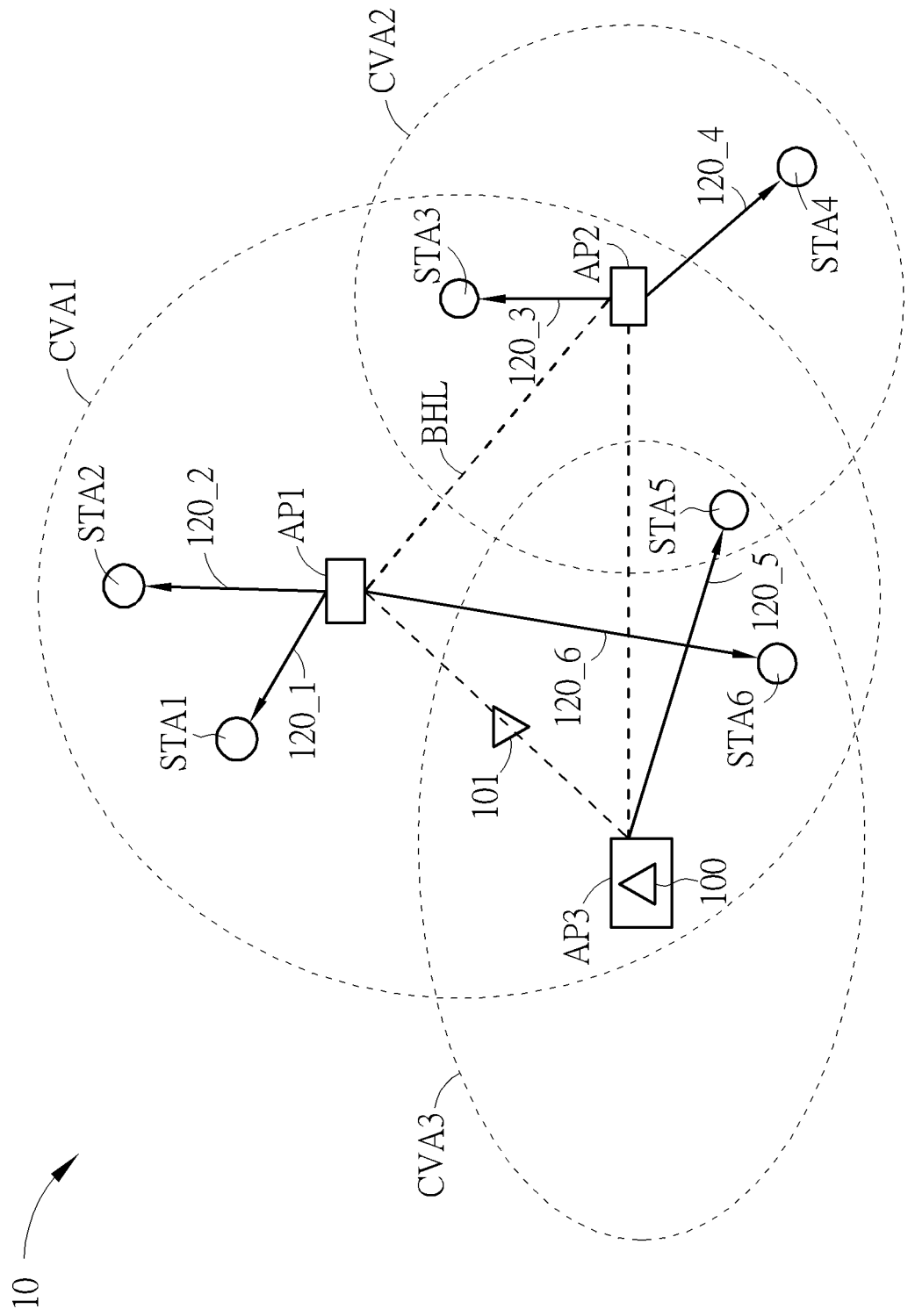
FIG. 1 is a diagram of an exemplary wireless network with multiple access points according to an embodiment of the present invention.

FIG. 1 is a diagram of an exemplary wireless network 10 with multiple access points according to an embodiment of the present invention. The wireless network 10, specifically, a MAP WLAN includes a CA controller 100, a plurality of access points AP1-AP3 connected via a backhaul BHL and representing the MAP, and a plurality of stations STA1-STA6.

The CA controller 100 is operable within the access point AP3 but it may also be operable as a separate device 101 connected to the backhaul BHL. According to the exemplary wireless network 10 and some embodiments of the present invention, the apparatus is implemented within CA controller 100.

There are transmission coverage areas CVA1-CVA3 corresponding to the access points AP1-AP3 defined as geographical areas in which the stations STA1-STA6 can associate with the corresponding access points AP1-AP3 and accordingly may be able to transmit and receive data successfully supporting at least the lowest 802.11 PHY Modulation Coding Scheme (MCS). The exemplary wireless network 10 also illustrates a plurality of coordinated associations 120_1-120_6 of each station STA1-STA6 with the corresponding AP. These coordinated associations 120_1-120_6 are coordinated and assigned by CA controller 100 to each station STA1-STA6. Specifically, FIG. 1 shows that the stations STA1, STA2, and STA6 are associated with the access point AP1, the stations STA3 and STA4 are associated with the access points AP2, and the stations STA5 is associated with the access point AP3. The CA controller 100 is being called periodically to compute associations for the wireless network 10, wherein only the STAs that require to associate with a new AP receive such a request from CA controller 100.

The exemplary wireless network 100 may include a user equipment (UE), a low cost device, a device-to-device (D2D) communication device, a narrow-band internet of things (IoT) (NB-IoT), a mobile phone, a laptop, a tablet computer, a portable computer system, any suitable apparatus, combination thereof, and the above are examples and should not limit the scope of the invention.

Figure 2:
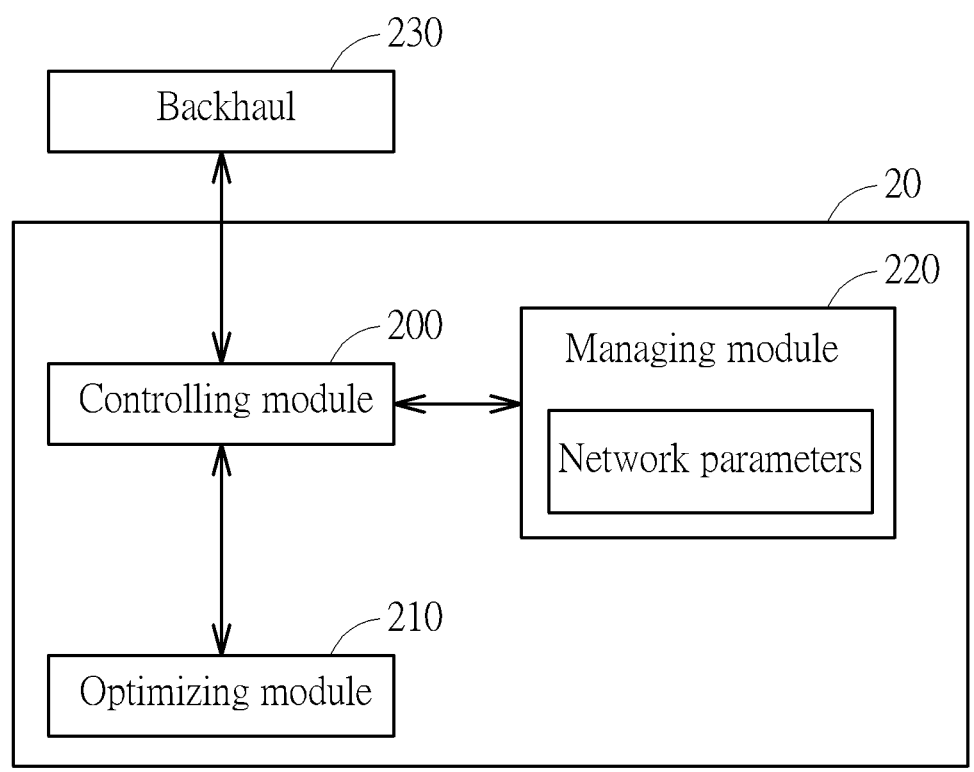
FIG. 2 illustrates a block diagram of an apparatus according to another embodiment of the present invention.

FIG. 2 illustrates a block diagram of an apparatus 20 according to another embodiment of the present invention, and may be used for realizing the CA controller 100 in FIG. 1. As shown in FIG. 2, the apparatus 20 may include a controlling module 200, an optimizing module 210 and a managing module 220. The controlling module 200 collects network parameters, distributes a plurality of computed association requests to each STA that is required to join to a new AP, updates a plurality of stored network parameters with a plurality of measurement parameters, and mitigates exceptions including but not limited to frequent re-association, faulty measurement parameters, security errors and other types of errors that may prevent a CA system failure. Additionally, the controlling module 200, connected to a MAP via backhaul link 230, sends periodic requests to APs in the MAP and a plurality of STAs to prepare and to send the network parameters to the CA controller 100. The optimizing module 210 computes a plurality of STA associations with new APs by performing optimization of an objective function wherein the network parameters serve as function variables. The optimizing module 210 is coupled with controlling module 200 that provides periodically the optimizing module 210 with new network parameters and with requests for computation of optimized associations. The optimizing module 210 is operable to pass the computed associations to the controlling module 200. The managing module 220 coupled to controlling module 200 is operable to store, estimate, and to manage the network parameters.

The modules may be realized by integrated circuits, hardware components, software components, firmware, or combination thereof.

Figure 3:
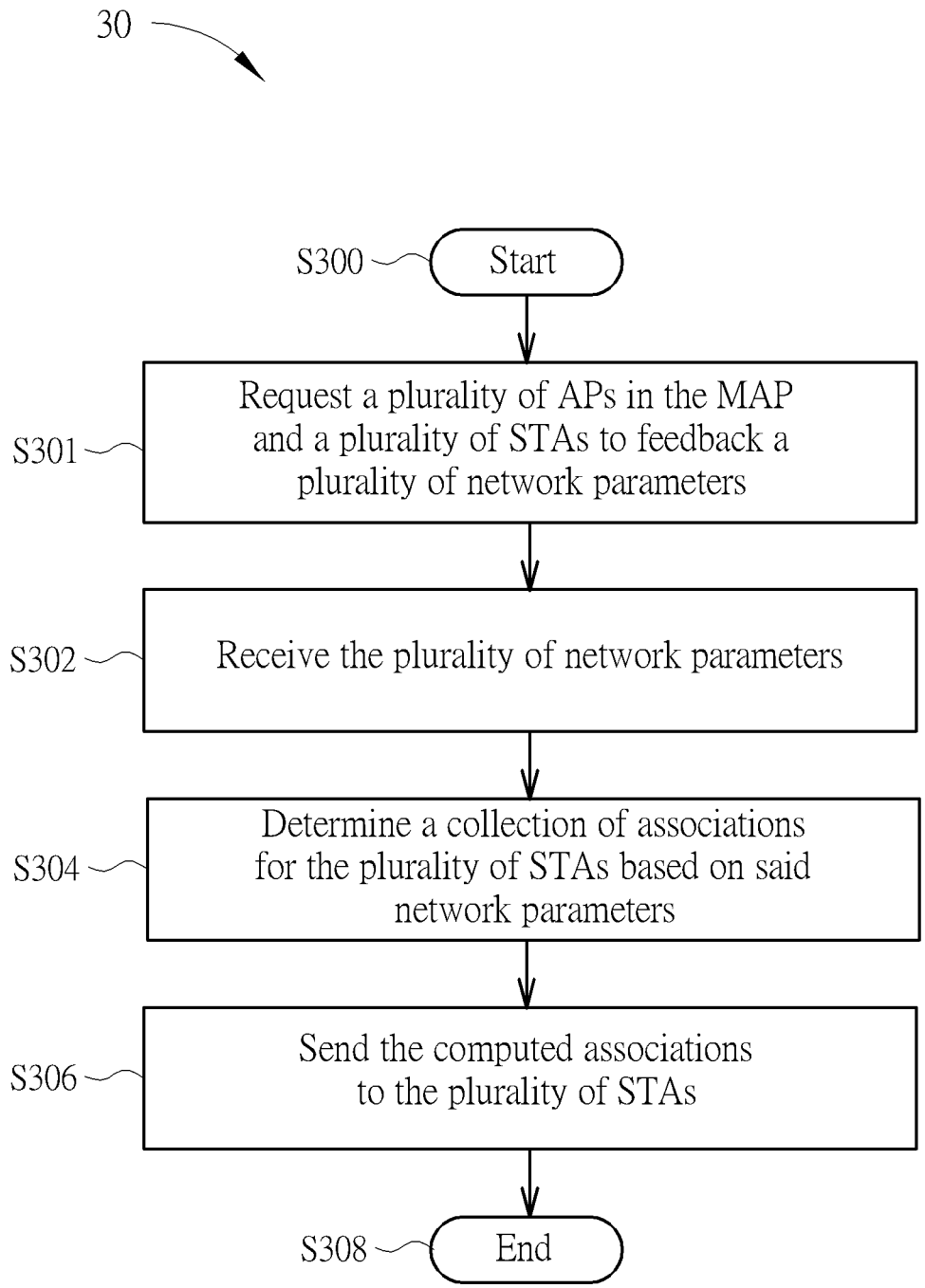
FIG. 3 is a flowchart illustrating an exemplary sequence of steps for performing coordinated association according to an embodiment of the present invention.

FIG. 3 is a flowchart illustrates a process 30 using an exemplary sequence of steps for performing the coordinated association method according to an embodiment of the present invention. The process 30 represents various aspects of implementing the CA controller and specifically, in accordance with the present disclose, represents the CA controller 100 operable in the exemplary network 10 shown in FIG. 1.

According to the process 30, at step S300, the process 30 starts. At step S301, the CA controller sends requests to APs in the MAP and a plurality of STAs to feedback to the CA controller a plurality of network parameters. The requests are forwarded first via a backhaul by CA controller to all APs in the MAP. Upon receiving the requests, the APs via a fronthaul also forward these requests to the plurality of STAs associated with these APs to submit network parameters.

At step S302, the plurality of network parameters is received for estimation, storage, and computation of AP-STA associations by the CA controller. Firstly, the plurality of STAs transmit the plurality of network parameters over a wireless fronthaul to the APs in a MAP. Once an AP collects all the required parameters from all the STAs associated with them, the AP forwards over a backhaul together its own measured parameters as well as the parameters received from STAs to the CA controller.

At step S304, the CA controller determines a plurality of AP-STA associations for the plurality of STAs, wherein each association is a pair between a STA from the plurality of STAs and an AP in the MAP. The CA controller computes AP-STA associations by performing optimization of an objective function based on said network parameters collected and further processed at step S302.

At step S306, the CA controller sends the computed set of AP-STA associations to the plurality of STAs. Firstly, the computed associations are sent via a backbone by the CA controller to APs in the MAP. Upon receiving the computed associations, the APs examine whether any of its associated STAs require to associate with a new AP and, if it is determined, the APs transmit re-association requests via a wireless fronthaul to the corresponding STAs. As step S308, the process 30 ends.

In one exemplary implementation, the network parameters may include a list of STAs that are registered with the MAP and enabled to support CA capability, a list of APs participating in the MAP, and a set of STAs associated with an AP of the MAP. The network parameters may also include a plurality of physical layer (PHY) rate estimations that can be supported over a transmission link between a STA and an AP in the MAP.

In one exemplary implementation, the PHY data rate estimate, $R_{i,j}$ between AP i and STA j, may be obtained by $R_{i,j}=f_{rate}(RSSI)$, where function $f_{rate}$ is a mapping of RSSI into a data rate estimate, wherein the RSSI represents a measure of channel quality between AP i and STA j. In one exemplary implementation, the function $f_{rate}$ may map the RSSI into a rate from the set with three elements, $\{r_{bad}, r_{moderate}, r_{good}\}$, depending on whether the RSSI value corresponds to a poor state when $RSSI \leq RSSI_{bad}$, moderate state when $RSSI_{bad} < RSSI < RSSI_{good}$, or good state $RSSI \geq RSSI_{good}$, where $RSSI_{bad}$ and $RSSI_{good}$ are the RSSI thresholds. Due to channel reciprocity, it is appreciated to have $R_{i,j}=R_{j,i}$ for all i and j.

In one exemplary implementation, the network parameters may include estimation parameters relating to traffic intensity. An AP in the MAP and STAs may be enabled with a capability to measure an amount of incoming data requested for transmission both on Downlink (DL) and Uplink (UL). The amount of incoming traffic on DL and UL may be represented by a normalized traffic intensity indicator metric that aims to show the arrival rate of incoming traffic and, on average, to show how often an AP on DL or STA on UL requests data transmissions. The measurements of traffic intensity indicators are performed by APs for the STAs associated with them on DL transmissions and by STAs on UL transmissions.

In one exemplary implementation, the network parameters may include a neighbor discovery parameter associated with a STA or an AP in the MAP. This parameter may be a list of STAs and APs that are contending on the same channel as said STA or AP in the MAP. The discovery of contending STAs and APs maybe discovered by examining the 802.11 destination address field of received frames.

The other network parameters may include an estimation parameter relating to frame length. It is appreciated that an AP in the MAP may have a capability to estimate an expected frame length on UL and DL transmissions for all the STAs that are associated with the AP. One exemplary implementation to estimate the UL and DL frame length parameters maybe to average the lengths of transmitted frames over a period of time.

Another exemplary implementation may include various timing parameters related to a time period to compute and allocate new association requests to STAs, a time period to request STAs and APs to provide network parameters to the CA controller, and a time period to update the stored network parameters and to compute new optimized AP-STA optimizations. The other parameters may include parameters related to error handling. The CA controller is required to monitor these parameters to mitigate a failure of CA system. These parameters may be related to frequent AP-STA re-associations, when a STA may experience frequent assignments of a new AP over a short period of time, denial of associations, arrival or departure of STAs into the MAP WLAN, or other suitable control, management, resource allocation, or scheduling parameters for handling the CA capability, but is not limited herein.

According to another exemplary implementation, the DL and UL throughput rates can be estimated as follows:

$$S_{i,j}^{DL} = \frac{w_{i,j}^{DL} L_{i,j}^{DL}}{|N_i|\left(\frac{1}{|N_i|}\sum_{k \in N_i} w_{i,k}^{DL} L_{i,k}^{DL}/R_{i,k} + \sum_{j \in I_i^{AP}} \frac{1}{|N_j|}\sum_{k \in N_j} w_{j,k}^{DL} L_{j,k}^{DL}/R_{j,k} + \sum_{k \in I_i^{STA}} \sum_{\substack{j=1,\ldots,M \\ k \in N_j}} w_{j,k}^{UL} L_{j,k}^{UL}/R_{j,k} + C(|I_i^{STA}|+|I_i^{AP}|)\right)} \quad (eq. 1)$$

and $$S_{i,j}^{UL} = \frac{w_{i,j}^{UL} L_{i,j}^{UL}}{w_{i,j}^{UL} L_{i,j}^{UL}/R_{i,j} + \sum_{l \in I_i^{AP}} \frac{1}{|N_j|}\sum_{k \in N_l} w_{l,k}^{DL} L_{l,k}^{DL}/R_{l,k} + \sum_{k \in I_j^{STA}} \sum_{\substack{l=1,\ldots,M \\ k \in N_l}} w_{l,k}^{UL} L_{l,k}^{UL}/R_{l,k} + C(|I_j^{STA}|+|I_j^{AP}|)} \quad (eq. 2)$$

where $S_{i,j}^{DL}$ and $S_{i,j}^{UL}$ are the expected DL and UL throughput rates of STA j when communicating with AP i. $L_{i,j}^{DL}$ and $L_{i,j}^{UL}$ are the average frame lengths on DL and UL transmission between STA j and AP i. The PHY rate $R_{i,j}$ denotes the rate at which data is transferred at the PHY layer between AP i and STA j. A station i in the MAP WLAN may have to contend for access to the channel along with its neighboring APs, denoted as the set of APs $I_i^{AP}$, and neighboring STAs, denoted as the set of STAs $I_i^{STA}$. These neighboring stations are located in the contending region of station i and thus, contend for the same channel as station i. The channel contention may result in a channel access delay due to collisions and backoffs. This channel delay is measured by a function C(·) which depends on the number of stations in the contending region of station i. Stations in the MAP have different arrival rates of incoming data intended for transmission. The traffic intensity indicators $w_{i,j}^{DL}$ and $w_{i,j}^{DL}$ characterize the amount of traffic scaled with respect to the average frame lengths when STA j communicates with AP i on DL and UL, respectively. These metrics $w_{i,j}^{DL}$ and $w_{i,j}^{DL}$ may be measured by STAs and AP over a period of time to capture the traffic characteristics and may be used as normalized values. Lastly, M is the number of APs in the MAP WLAN and $N_i$ is the set of STAs associated with AP i. The cardinality of sets is denoted by $|N_i|$, $|I_i^{STA}|$ and $|I_i^{AP}|$.

The term $$\frac{1}{|N_i|}\sum_{k \in N_i} w_{i,k}^{DL} L_{i,k}^{DL}/R_{i,k}$$

is the average transmission time $T_i$ of AP i employing a frame-based round-robin scheduler for DL transmissions of STAs $N_i$ associated with AP i. Notably, $$\overline{R}_i = \frac{1}{\overline{T}_i}$$

is the average transmission rate of AP i.

The term $$\sum_{k \in I_i^{STA}} \sum_{\substack{j=1,\ldots,M \\ k \in N_j}} w_{j,k}^{UL} L_{j,k}^{UL}/R_{j,k}$$

is the total transmission time required by neighboring STAs $I_i^{STA}$ in the contending region of station i to transmit UL data.

The total throughput rate S in the MAP WLAN can be then expressed as follows:

$$S = \Sigma_{i=1,\ldots,M} \Sigma_{j \in N_i}(S_{i,j}^{UL} + S_{i,j}^{DL}). \quad (eq. 3)$$

In one exemplary implementation, the CA controller may perform the following to find a plurality of optimized AP-STA associations:

$$\max S \quad (eq. 4)$$

subject to $$S = \Sigma_{i=1,\ldots,M} \Sigma_{j \in N_i}(S_{i,j}^{UL} + S_{i,j}^{DL}) \quad (eq. 5)$$

$$N_i = \cup_{j \in U}(j \cap 1_{\{a_{i,j}=1\}}) \; \forall i=1,\ldots,M \quad (eq. 6)$$

$$a_{i,j} \in \{0, 1\} \; \forall j \in U, \forall i=1,\ldots,M \quad (eq. 7)$$

$$\Sigma_{i=1,\ldots,M} a_{i,j} \leq 1 \; \forall j \in U. \quad (eq. 8)$$

The objective function is to maximize the total throughput rate in the MAP WLAN but it also may be $\Sigma_{i=1,\ldots,M} \Sigma_{j \in N_i} \log(S_{i,j}^{UL} + S_{i,j}^{DL})$ or $$\min_{\substack{i=1,\ldots,M \\ j \in N_i}} \left( S_{i,j}^{UL} + S_{i,j}^{DL} \right).$$

The collection of all STAs in the MAP system is denoted by U and $a_{i,j}$ are the binary variables that indicate STA j is associated with AP i when $a_{i,j}=1$ otherwise it is not. $1_{\{a_{i,j}=1\}}$ is the indicator function and is equal to an empty set when $a_{i,j}=1$ otherwise it is equal to a universal set.

The numerical solution to the exemplary implementation presented in (eq. 4)-(eq. 8) may be an optimal or near-optimal AP-STA associations. With this solution, the CA controller may maximize the total throughput in a MAP WLAN, reduce latency, and distribute traffic load evenly in the network.

Figure 4:
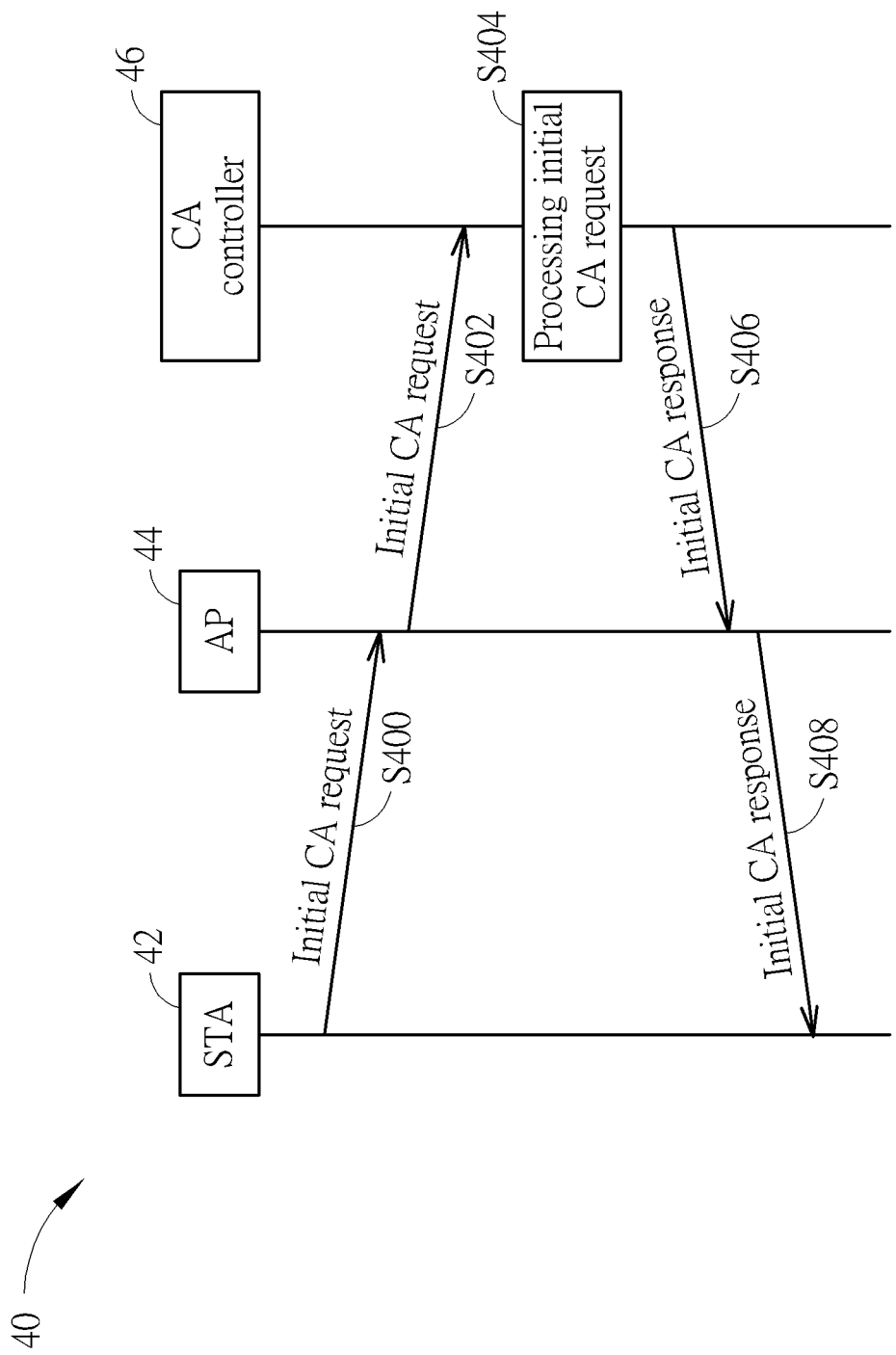
FIG. 4 shows a flowchart illustrating an exemplary process for registering a STA with coordinated association services according to an embodiment of the present invention.

FIG. 4 shows a flowchart illustrating an exemplary process 40 for registering a STA with coordinated association services according to an embodiment of the present invention. The CA controller may manage AP-STA associations only for STAs that have been registered with CA services. FIG. 4 shows a sequence of exemplary steps that a STA in the MAP WLAN may perform to register with CA controller for enabling the CA capability.

It is a prerequisite for the CA registration process that STAs may register only with a MAP supporting CA services. The APs may announce support of CA services to STAs in beacons, management frames, or in combination thereof. In one exemplary implementation, beacons and management frames may contain a CA capability field in the 802.11 MAC header. By setting this field, the APs in a MAP may announce CA services support to STAs.

With regard to FIG. 4, the various parts of CA registration process 40 may be implementable within STA 42, AP 44, and CA controller 46. The STA 42 and AP 44 maybe one of the stations STA1-STA6 and access points AP1-AP3, respectively, as depicted in the exemplary MAP WLAN in FIG. 1.

Prior to the start of process 40, it is appreciated that STA 42 has received information on support of CA services from an AP by examining the CA capability field in the 802.11 MAC header of a beacon or management frame. It is also appreciated that STA 42 has determined to enable the CA capability by performing the registration process 40.

At step S400, STA 42 transmits an initial CA request to AP 44 over a wireless fronthaul.

At step S402, AP 44 sends the initial CA requests to CA controller 46 using a pre-defined inter-AP communication protocol via a wireless or wired backhaul.

Upon receiving the initial CA request, at step S404, CA controller 46 processes this request by adding STA 42 to the list of registered STAs with CA service, allocating resources for managing network parameters associated with STA 42, updates the optimizing module of the CA controller with new variables, and testing against critical errors. If the CA registration process 40 is successful with STA 42, the CA controller 46 responds to STA 42 by sending the initial CA response. At step S406, the CA controller 46 sends the CA response to AP 44 via the backhaul and at step S408, the AP 44 forwards this response to STA 42 by using the fronthaul interface.

The exemplary steps of process 40 are not limited to said description. The following exemplary implementations may be additionally attributed for performing process 40.

The STA 42 may start measuring network parameters, as soon as STA 42 receives the initial CA response. The STA 42 may not need to perform additional authentication process with the MAP or CA controller, since STA 42 has been already authenticated with AP 44 which is an AP member of the MAP. It is appreciated that during the registration with a MAP, the STA 42 may receive an identification number that uniquely identifies STA 42 in the MAP WLAN. Using this MAP identification number, STA 42 can also be uniquely identified by the CA controller or other APs in the MAP while performing AP-STA association requests.

Figure 5:
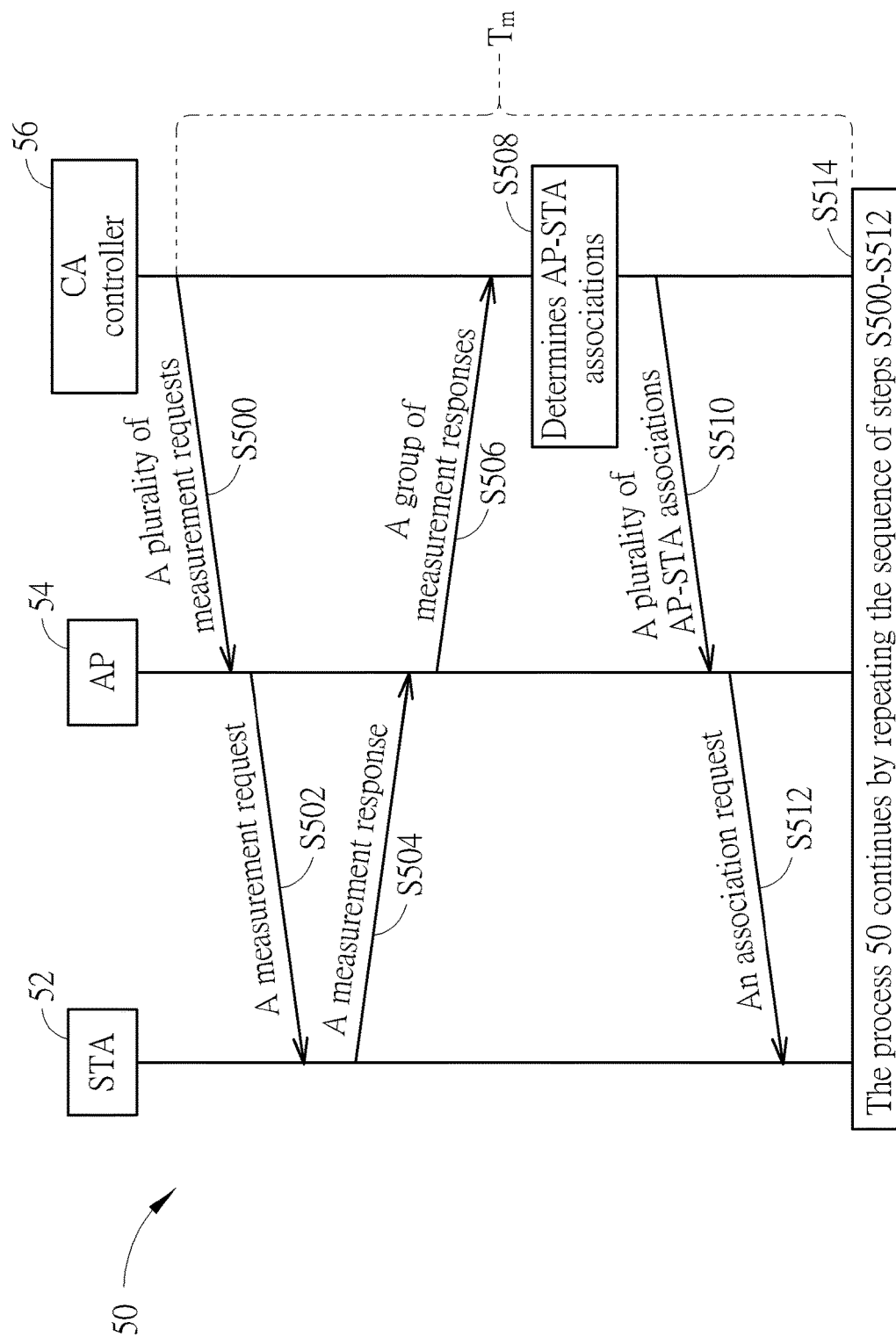
FIG. 5 shows a flowchart illustrating an exemplary sequence of steps for managing association requests according to an embodiment of the present invention.

FIG. 5 shows a process 50 describing an exemplary sequence of steps for managing coordinated association in a MAP WLAN according to an embodiment of the present invention. For performing coordinated association, the CA controller periodically collects a plurality of measured network parameters sent by the STAs and APs in a MAP. Using said network parameters, the CA controller periodically computes AP-STA associations and sends the computed association requests to STAs that are registered with CA services and required to associate with a new AP. The process 50 shows a sequence of steps that STAs, APs, and CA controller periodically need to perform for managing coordinated association in a MAP.

With regard to FIG. 5, the various parts of process 50 may be implementable within STA 52, AP 54, and CA controller 56. The STA 52 and AP 54 maybe one of the stations STA1-STA6 and access points AP1-AP3, respectively, as depicted in the exemplary MAP WLAN in FIG. 1. The CA controller 56 may be implemented using the apparatus described in FIG. 2.

At step S500, the process 50 starts by CA controller 56 sending a plurality of measurement requests to AP 54. The step S500 is an exemplary step with AP 54 representing only one of the AP in the MAP. Therefore, it is appreciated that step S500 represents a plurality of transmissions of requests between the CA controller and all the APs in the MAP. After examining the received requests sent by CA controller, an AP may send a measurement request only to the STAs that are associated with said AP. At step S502, AP 54 sends a measurement request over a wireless fronthaul to STA 52. The step S502 is an exemplary step with STA 52 representing only one of the STAs associated with AP 54 and registered with CA services. Therefore, step S502 represents a plurality of transmissions of measurement responses sent by the STAs associated with AP 54.

At step S504, in response to the received measurement request, STA 52 transmits a measurement response with network parameters over a wireless fronthaul to AP 54. It is appreciated that step S504 is carried out by all other STAs that have received measurement requests. AP 54 collects the measurement responses from all the STAs associated with AP 54 and at step S506, AP forwards a group of measurement responses collected from the STAs along with its own measured network parameters to CA controller 56 via a backhaul.

The CA controller 56, at step S508, determines AP-STA associations using the received network parameters from STAs and APs in the MAP according to the steps S500-S506. In one exemplary implementation, the CA controller may compute AP-STA associations using (eq. 4)-(eq. 8).

After the determination of associations, at step S510, the CA controller sends a plurality of computed AP-STA associations to AP 54 via a backhaul, wherein an AP-STA association is intended only for STAs that require to associate with a new AP.

At step S512, AP 54 sends via a wireless fronthaul a request to STA 52 to associate with a new AP. It is appreciated that step S512 represents a plurality of transmissions of association requests to all STAs that are associated with AP 54 and required to associate with a new AP in the MAP. At step S512, the STA 52 is not permitted to break the ongoing traffic flow. The STA 52 is required to finish transmitting or receiving data to or from AP 54 before STA 52 can start initiating an association with a new AP.

At step S514, the sequence of steps S510-S512 is repeated and the process 50 continues periodically by repeating the sequence of steps S510-S512 after the time interval $T_m$. In one exemplary implementation, the sequence of steps S510-S512 may repeat on events when a new STA registers or unsubscribes with the CA services.

Figure 6:
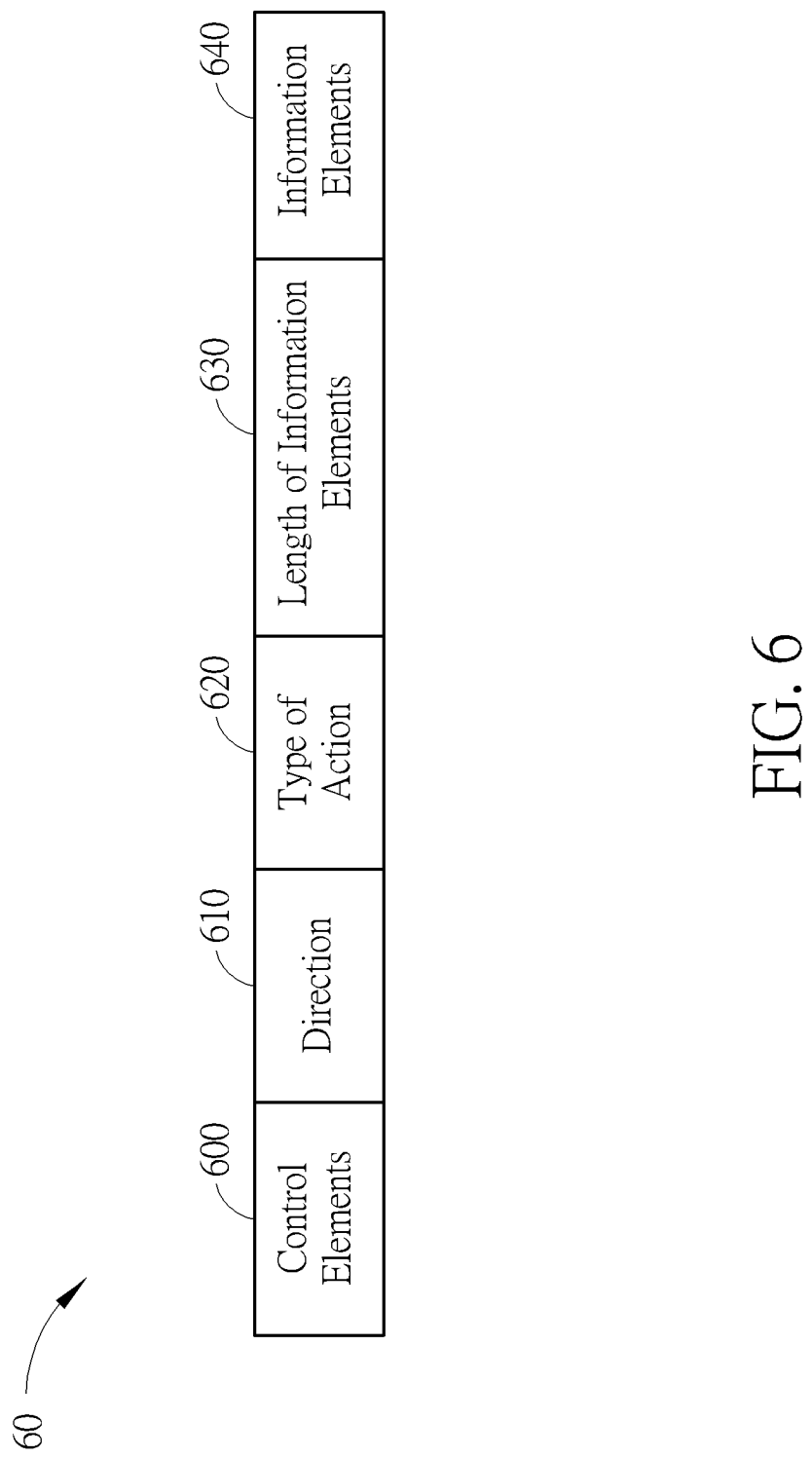
FIG. 6 shows a diagram of an exemplary frame structure for supporting coordinated association according to an embodiment of the present invention.

FIG. 6 shows a diagram of an exemplary frame structure 60 for supporting coordinated association in a MAP WLAN according to an embodiment of the present invention. The frame structure 60 may be used for data exchanges between CA controller, APs in the MAP and STAs. The frame structure 60 may include a field 600 of "Control elements", a field 610 of "Direction", a field 620 of "Type of action", a field 630 of "Length of Information elements" and a field 640 of "Information elements".

The field 600 of "Control elements" may carry error flags, a number of completed associations, or association denial requests, but is not limited herein. The field 610 of "Direction" may be "Backhaul" used to indicate transmissions over a backhaul or "Access link" used to indicate transmission over a wireless fronthaul. The field 620 of "Type of action" may specify a frame type and may be "Initial CA Request", "Initial CA Response", "Measurement Request", "Measurement Response", "Transition Association Request", or "Assignment Action Table". The field 630 of "Length of Information elements" may indicate a length of field 640 of "Information elements".

The length of field 640 of "Information elements" may be varying. The field 640 of "Information elements" may include information according to field 620 of "Type of action". The field 640 of "Information elements" may be empty, when field 620 of "Type of action" includes "Initial CA Request" and field 610 of "Direction" includes "Access Link". The field 640 of "Information elements" may include an AP ID, known as a BSS ID, when field 620 of "Type of action" includes "Initial CA Request" and field 610 of "Direction" includes "Backhaul". The AP ID may be obtained when a STA joins the MAP. The field 640 of "Information elements" may include an AP ID and a STA ID, when field 620 of "Type of action" includes "Initial CA Response" and field 610 of "Direction" includes both "Access Link" and "Backhaul". The field 640 of "Information elements" may include an AP ID and a STA ID, when field 620 of "Type of action" includes "Measurement Request" and field 610 of "Direction" includes both "Access Link" and "Backhaul". The field 640 of "Information elements" may include a list of network parameters along with an AP ID and a STA ID, when field 620 of "Type of action" includes "Measurement Response". The field 640 of "Information elements" may include a request to a station with STA ID to associate with a new access point with AP ID, when field 620 of "Type of action" includes "Transition Association Request". The field 640 of "Information elements" may include a plurality of AP-STA associations intended for access point with AP ID, when field 620 of "Type of action" includes "Assignment Action Table".

The operation of "determine" described above may be replaced by the operation of "compute", "calculate", "obtain", "generate", "output", "use", "choose/select" or "decide". The term of "according to" described above may be replaced by "in response to". The phrase of "associated with" described above may be replaced by "of" or "corresponding to". The term of "via" described above maybe replaced by "on", "in" or "at".

Detailed embodiments and implementations have been described above in the specification and thus are omitted here for brevity. Reference may be made to the above sections.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling coordinated association (CA) in a wireless network with a plurality of access points (APs) for an apparatus, comprising:
   receiving periodically a plurality of network parameters, after sending a plurality of requests by the plurality of APs to a plurality of stations (STAs);
   determining a plurality of associations between the plurality of STAs and the plurality of APs according to the plurality of network parameters; and
   sending the plurality of associations to the plurality of STAs;
   wherein the plurality of network parameters includes the plurality of STAs and the plurality of APs in a multiple APs (MAP), physical layer (PHY) rate estimates, traffic intensity estimates, neighbor discover parameters, the frame lengths estimates, and timing recovery parameters.

2. The method of claim 1, wherein the plurality of requests are forwarded to the plurality of STAs that are registered with CA services, and the registration is performed by sending an initial CA request by a STA to a CA controller.

3. The method of claim 1, wherein the plurality of network parameters are received via a backhaul.

4. The method of claim 1, wherein the plurality of APs are in a multiple APs (MAP) connected via a backhaul link with a CA controller and capabilities to receive and to send periodic requests and the plurality of network parameters, announcement and registration mechanisms of the plurality of STAs with the MAP.

5. The method of claim 4, wherein each association in the plurality of associations is a pair between a STA from the plurality of STAs and an AP in the MAP computed and recommended by the CA controller for the plurality of STAs to initiate re-association requests.

6. The method of claim 4, wherein an association from said plurality of associations is sent via a fronthaul by an AP in the MAP to a STA from the plurality of STAs wherein the STA is required to associate with a new AP.

7. The method of claim 1, further comprising:
   obtaining the plurality of recommended associations by a CA controller by performing algorithmic optimization according to the plurality of network parameters.

8. The method of claim 1, further comprising:
   sending an initial CA request by a STA to a CA controller;
   processing the initial CA request by the CA controller by adding the STA to a list of registered STAs with a CA service; and
   sending an initial CA response corresponding to the initial CA request by a CA controller to the STA.

9. An apparatus for handling coordinated association (CA) in a wireless network with a plurality of access points (APs), comprising:

a controlling module, is configured for receiving periodically a plurality of network parameters after sending a plurality of requests by the plurality of APs to a plurality of stations (STAs) and for sending a plurality of associations between the plurality of STAs and the plurality of APs to the plurality of STAs; and an optimizing module, coupled to the controlling module, is configured for determining the plurality of associations according to the plurality of network parameters;

wherein the plurality of network parameters includes the plurality of STAs and the plurality of APs in a multiple APs (MAP), physical layer (PHY) rate estimates, traffic intensity estimates, neighbor discover parameters, the frame lengths estimates, and timing recovery parameters.

10. The apparatus of claim 9, wherein the plurality of requests are forwarded to the plurality of STAs that are registered with CA services, and the registration is performed by sending an initial CA request by a STA to a CA controller.

11. The apparatus of claim 9, wherein the plurality of network parameters are received via a backhaul.

12. The apparatus of claim 9, wherein the plurality of APs are in a multiple APs (MAP) connected via a backhaul link with a CA controller and capabilities to receive and to send periodic requests and the plurality of network parameters, announcement and registration mechanisms of the plurality of STAs with the MAP.

13. The apparatus of claim 12, wherein each association in the plurality of associations is a pair between a STA from the plurality of STAs and an AP in the MAP computed and recommended by the CA controller for the plurality of STAs to initiate re-association requests.

14. The apparatus of claim 12, wherein an association from said plurality of associations is sent via a fronthaul by an AP in the MAP to a STA from the plurality of STAs wherein the STA is required to associate with a new AP.

15. The apparatus of claim 9, wherein the optimizing module is further configured for obtaining the plurality of recommended associations by a CA controller by performing algorithmic optimization according to the plurality of network parameters.

16. The apparatus of claim 9, further comprising:
sending an initial CA request by a STA to a CA controller;
processing the initial CA request by the CA controller by adding the STA to a list of registered STAs with a CA service; and
sending an initial CA response corresponding to the initial CA request by a CA controller to the STA.

* * * * *